United States Patent
Nakamura et al.

(10) Patent No.: US 6,410,157 B1
(45) Date of Patent: Jun. 25, 2002

(54) CASTING FILM FOR PRODUCING CERAMIC GREEN SHEET

(75) Inventors: Toru Nakamura; Tomishi Shibano, both of Saitama (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 09/883,257

(22) Filed: Jun. 19, 2001

(30) Foreign Application Priority Data

Jul. 6, 2000 (JP) .................................. 2000-205642

(51) Int. Cl.[7] .................... B32B 7/06; B32B 27/08; B32B 27/30; B32B 27/36; B32B 27/42
(52) U.S. Cl. .................. 428/482; 428/41.5; 428/41.8; 428/480; 428/483; 428/520
(58) Field of Search .................. 928/41.5, 41.8, 928/480, 482, 483, 520

(56) References Cited

U.S. PATENT DOCUMENTS

| | | | | |
|---|---|---|---|---|
| 4,218,294 A | * | 8/1980 | Brack | 427/154 |
| 4,288,479 A | * | 9/1981 | Brack | 427/147 |
| 4,303,696 A | * | 12/1981 | Brack | 427/503 |
| 5,425,991 A | * | 6/1995 | Lu | 428/345 |
| 5,656,347 A | * | 8/1997 | Tynan, Jr. | 428/353 |

FOREIGN PATENT DOCUMENTS

JP  9-003288 A  *  1/1997

* cited by examiner

*Primary Examiner*—Vivian Chen
(74) *Attorney, Agent, or Firm*—Oblon, Spivak, McClelland, Maier & Neustadt, P.C.

(57) ABSTRACT

There is disclosed a casting film which is used for producing a ceramic green sheet and which comprises a substrate film (e.g. polyethylene terephthalate film) and a releasing layer formed thereon comprising a cured resin from (A) a stearic acid-modified alkyd resin and/or a stearic acid-modified acrylic resin and a (B) amino resin (e.g. melamine resin, urea resin and urea-melamine resin, each being etherified by a lower alcohol). The above casting film has excellent wettability of ceramic slurry and moderate releasability for the ceramic green sheet without the occurrence of repelling at the time of applying coating, and is well suited for use in the production of ceramic green sheets that are employed for ceramic capacitors, laminated inductor elements, etc.

7 Claims, No Drawings

CASTING FILM FOR PRODUCING CERAMIC GREEN SHEET

BACKGROUND OF THE INVENTION

1. Field of the Invention

The present invention relates to a casting film for producing a ceramic green sheet. More particularly, it is concerned with a casting film which is used in the production process of a ceramic green sheet in producing ceramic electronic part items, and which has excellent wettability of ceramic slurry and moderate releasability for the ceramic green sheet.

2. Description of the Related Arts

A ceramic electronic part item such as a capacitor, a laminated inductor element, a piezoelectric-part, a thermistor and a varister is produced by a method comprising the steps of forming a green sheet by coating a casting film with ceramic slurry which is well suited to the above-mentioned electronic part items, which is used in high dielectric-constant, magnetism and the like, and which is composed of ceramic powders, organic binders, plasticizers, solvents (an organic solvent or water) and the like (Step ①); equipping the resultant green sheet with an electrode made of palladium, silver, nickel or the like by means of screen printing (Step ②); then peeling off the green sheet from the casting film and laminating the green sheets in multi-layer (Step ③); forming ceramic green chips through steps of pressing and cutting (Step ④); baking the chips thus obtained (Step ⑤); and equipping the baked chips with terminal electrodes made of silver, silver palladium, nickel, copper or the like (Step ⑥). In addition thereto, there has recently been proposed a new production process in which the above-mentioned Steps ① and ② are repeated plural times, followed by the Step ③ {refer to Japanese Patent Application Laid-Open No. 130150/1996 (Heisei-8)}.

As a casting film used in the production process of ceramic electronic part items, a polyester film coated with a silicone based releasing agent has hitherto been frequently employed.

Further, there is proposed a carrier film which is used for casting green sheets, and in which a releasing layer is composed of an alkyd resin, melamine resin and dimethylpolysiloxane {refer to Japanese Patent Application Laid-Open No. 137218/1995 (Heisei-7)}.

In addition, there is proposed a releasable base film which is used for producing ceramic sheets, and in which a releasing layer is composed of an amino base copolymer resin {refer to Japanese Utility Model Publication No. 38884/1993 (Heisei-5)}.

Accompanying miniaturization, weight-saving and improved performance of ceramic electronic parts in recent years, a thin-filmed green sheet is in rapid progress, and is required to have a film thickness of 10 μm or smaller for aqueous ceramic green sheets and a film thickness of 4 μm or smaller for solvent base ceramic green sheets. However, it has been difficult for any of conventional casting films to satisfy at the same time, both the requirements including wettability such that enables uniform coating to be formed even for small coating thickness without causing repelling in the case of applying ceramic slurry, and also moderate releasability from a green sheet such that, in the case of a method in which the above-mentioned Steps ① and ② are repeated plural times so as to constitute a multi-layer coating, enables favorable multi-layer coating to be carried out without causing excessive releasability and without causing relieving and/or peeling off of the firstly formed green sheet from the casting film when ceramic slurry is repeatedly applied on and after the second time.

SUMMARY OF THE INVENTION

In such circumstances, an object of the present invention is to provide a casting film which is used in the production of a ceramic green sheet to be employed in a ceramic electronic part items, and which is imparted with excellent wettability of ceramic slurry and moderate releasability for the ceramic green sheet, while occurrence of repelling is suppressed at the time of ceramic slurry coating.

Other objects of the present invention will be obvious from the text of this specification hereinafter disclosed.

As a result of intensive extensive research and investigation accumulated by the present inventors in order to develop a casting film which is used for producing a ceramic green sheet and which is imparted with the foregoing requisite performances, it has been found that a casting film which is adapted to the objects of the invention is obtainable by using, as a releasing agent which constitutes a releasing layer, a cured resin from a stearic acid-modified alkyd resin and/or a stearic acid-modified acrylic resin and an amino resin. The present invention has been accomplished on the basis of such findings and information.

That is to say, the present invention provides:

(1) a casting film which is used for producing a ceramic green sheet and which comprises a substrate film and a releasing layer formed on at least either side thereof, wherein said releasing layer comprises a cured resin from (A) a stearic acid-modified alkyd resin and/or a stearic acid-modified acrylic resin and a (B) amino resin;

(2) the casting film for producing a ceramic green sheet as set forth in the preceding item (1), wherein the stearic acid-modified alkyd resin has a stearyl group content of 40 to 60% by weight, and/or stearic acid-modified acrylic resin has a stearyl group content of 20 to 40% by weight;

(3) the casting film for producing a ceramic green sheet as set forth in the preceding item (1), wherein the (B) amino resin is at least one member selected from the group consisting of melamine resin, urea resin and urea-melamine resin each being etherified by a lower alcohol;

(4) the casting film for producing a ceramic green sheet as set forth in any of the preceding items (1), (2) and (3), wherein the content of the component (B) is 5 to 40% by weight based on the total sum of the solid content of the components(A) and (B);

(5) the casting film for producing a ceramic green sheet as set forth in the preceding item (1), wherein the substrate film comprises polyethylene terephthalate;

(6) the casting film for producing a ceramic green sheet as set forth in the preceding item (1), wherein the component (A) is composed of the mixture of the stearic acid-modified alkyd resin and the stearic acid-modified acrylic resin; and (7) the casting film for producing a ceramic green sheet as set forth in the preceding item (1), wherein the cured resin is formed in the presence of an acid catalyst.

DESCRIPTION OF PREFERRED EMBODIMENT

The casting film for producing a ceramic green sheet (hereinafter referred simply to as "casting film") according to the present invention comprises a substrate film and a releasing layer formed on at least either side thereof. The releasing agent constituting the releasing layer comprises a cured resin from (A) a stearic acid-modified alkyd resin and/or a stearic acid-modified acrylic resin and a (B) amino resin, and may further be incorporated as desired, with a release modifier, an adhesion improver and the like.

The alkyd resin and acrylic resin as the component (A) are each modified with stearic acid, whereas any of alkyd resin and acrylic resin that are not modified therewith fails to assure favorable releasing performance for the green sheet and attain the objects of the present invention.

The degree of modification in the above-mentioned resins is not specifically limited, but it is suitable to select said degree so that the stearic acid-modified alkyd resin has a stearyl group content of about 40 to 60% by weight, and the stearic acid-modified acrylic resin has a stearyl group content of about 20 to 40% by weight from the viewpoint of the balance between favorable wettability of ceramic slurry and the releasability of green sheets.

As the above-mentioned alkyd resin and acrylic resin, there are usable the alkyd resin and acrylic resin that have hitherto been customarily used as a resin component of alkyd resin paint and heat curable acrylic resin paint, respectively.

The alkyd resin is produced by well known esterification reaction of combinational components of a polyol, a polybasic acid or an anhydride thereof, and any of a variety of modifying agents that are used at need.

Examples of the above-mentioned polyol include ethylene glycol; propylene glycol; diethylene glycol; butylene glycol; neopentyl glycol; hexanediol; 2,2-dimethylpentanediol-1,3; hydrogenated bisphenol A; hexylene glycol; glycerol; trimethylolethane; trimethylolpropane; 1,2,6-hexnaetriol; trimethycyclohaxane; pentaerythritol; sorbitol; diglycerol; and dipenta-erythritol. There are also usable in addition to the foregoing, tris(2-hydroxyethyl)isocyanurate; 2,2-dimethyl-3-hydroxypropanol; and the like. Any of the above-exemplified polyol components may be used alone or in combination with at least one other.

The above-mentioned polybasic acid and an anhydride thereof are exemplified by phthalic anhydride, isophthalic acid, terephthalic acid, tetrahydrophthalic anhydride, maleic anhydride, fumaric acid, succinic acid, glutaric acid, adipic acid, trimethyladipic acid, sebacic acid, trimellitic anhydride and butanetetracarboxylic acid and the like. Any of the aforesaid polybasic acid and anhydride thereof may be used alone or in combination with at least one other.

The modifying agents are exemplified by fatty acids, phenol, rosin, styrene and acrylic compounds, of which is used in the present invention, stearic acid which is one of the fatty acids.

On the other hand, the heat curable acrylic resin is the acrylic resin which has reactive groups in the molecules and which is heat-cured by the use of a crosslinking agent such as an amino resin, an epoxy resin, a phenolic resin or the like. For instance, there is known the heat curable acrylic resin which is produced by a process wherein a starting material such as an acrylic ester, styrene and acrylamide is reacted, and then further reacted with formalin so that an aldehyde is bonded to the amide in the polymer. During the process, the acrylic resin can be modified by the use of various modifying agents. In the present invention, the modifying agent is stearic acid.

The component (A) to be used for constituting the releasing layer in the casting film according to the present invention may be any of stearic acid-modified alkyd resin, stearic acid modified-acrylic resin and a mixture thereof. Of these a mixture thereof is preferable to assure favorable wettability of ceramic slurry and releasability for green sheet.

On the other hand, there are usable as the amino resin of the component (B), conventional amino resins that are well known as a curing agent for alkyd resin paint, heat curable acrylic resin paint and the like. Specific examples of the foregoing amino resins include melamine resin, urea resin, urea-melamine resin, guanamine resin, glycoluryl-formaldehyde resin, succinylamide-formaldehyde resin, ethyleneurea-formaldehyde resin, each of which having hydroxy groups or alkoxy groups. Any of the above exemplified resin can readily be obtained by a process wherein melamine, urea, guanamine, glycoluryl, succinylamide, ethyleneurea or the like is reacted for methylolation with formalin in boiling water, and as the case may be the reaction product is further reacted for etherification with methanol, ethanol, propanol, butanol or the like.

It is preferable in the present invention from the aspect of accelerating the curing of the resin to use at least one member selected from the group consisting of melamine resin, urea resin and urea-melamine resin each being etherified, methyl etherified, ethyl etherified or butyl etherified with a lower alcohol.

It is preferable in the present invention to use the amino resin of the component(B) in an amount in the range of 5 to 40% by weight based on the total sum of the solid content of resin components (A) and (B). The amount thereof, when being less than 5% by weight based thereon, brings about insufficient curing, making it difficult to form a releasing layer having desirable physical properties, whereas the amount thereof, when being more than 40% by weight based thereon, causes lowered releasability for ceramic green sheet. In consideration of the curability of the resin, releasability for ceramic green sheet and the like factors, the use amount of the amino resin as the component (B) is particularly preferably in the range of 10 to 30% by weight based thereon.

In order to accelerate the curing reaction in curing with the amino resin, there may be used as desired, an acid catalyst, for instance, para-toluenesulfonic acid in an amount of at most 20 parts by weight based on 100 parts by weight of the total sum of the solid content of the resin components (A) and (B).

The substrate film to be used in the present invention is not specifically limited, but it may be properly optionally selected for use from the well known films which have heretofore been usable as a substrate film for a casting film for producing a ceramic green sheet. Examples of such films include a polyester film made of polyethylene terephthalate (PET), polyethylene naphthalate or the like, a polyolefin film made of polypropylene, polymethylpentene or the like, a polycarbonate film and polyvinyl acetate film. Of these, a polyester film is preferable and a biaxially oriented polyethylene terephthalate film is preferable in particular from the aspects of smoothness, heat resistance and cost. There is usually used a substrate film having a thickness in the range of 12 to 125 μm.

In order to obtain the casting film in accordance with the present invention, a coating solution for forming the releasing layer is prepared at first. The aforesaid coating solution is prepared by adding the above-mentioned stearic acid-modified alkyd resin and/or stearic acid-modified acrylic resin as the component (A) and the amino resin as the component (B) and as desired, the acid catalyst and the like in a proper organic solvent such as toluene, ethyl acetate, methyl ethyl ketone, a denatured alcohol and hexane, and forming a coating solution having a viscosity which enables coating work.

The coating solution may be incorporated at need, with an alkyd resin and/or an acrylic resin each being modified with a fatty acid other than stearic acid; a filler; an antistatic agent; a dye; a pigment; an other additive; and the like.

The coating solution thus prepared is applied to either or both sides of the aforesaid substrate film by means of, for instance, gravure coat method, bar coat method, multi-roll coat method, spray coat method, spin coat method or the like.

The coating amount expressed in terms of solid content is in the range of suitably 0.04 to 2.00 g/m$^2$, preferably 0.07 to 1.00 g/m$^2$ in particular. The coating amount, when being less than 0.04 g/m$^2$, brings about poor releasability of the ceramic green sheet, whereas the coating amount, when being more than 2.00 g/m$^2$, gives rise to possibility of causing repelling at the time of ceramic slurry coating.

In order to cure the coating solution thus applied thereto, it is subjected to heating treatment with an oven of a coating machine. In the case of heating treatment, the condition thereof is not specifically limited provided that a period of time for sufficient curing is assured at a temperature in the range of 100 to 160° C., and it is usually suitable to carry out the heating treatment for 5 to 120 seconds thereat.

In order to further enhance the adhesiveness between the substrate film and the releasing layer, the substrate film may in advance, be subjected to adhesiveness enhancing treatment such as corona discharge treatment, ozone treatment, flame treatment, anchor coat agent coating and the like. Moreover for the purpose of antistaticity, an antistatic agent may be kneaded in advance into the coating solution. Alternatively, a substrate film coated with an antistatic agent may be used.

Moreover, the releasing agent may be applied to the entire surface of the substrate film or to part of the surface thereof, for instance, pattern coating in which a non-coating portion is placed at both the ends so as to regulate the releasability and adhesiveness.

The casting film thus obtainable according to the present invention is used for producing a ceramic green sheet. It is preferable that the ceramic green sheet has a thickness of 20 μm or smaller, and is more preferable that the ceramic green sheet has a thickness of 10 μm or smaller for an aqueous system, and 4 μm or smaller for a solvent system.

In summarizing the working effect of the casting film according to the present invention, the casting film which is imparted with excellent wettability of ceramic slurry and moderate releasability for ceramic green sheets can readily be obtained by forming on a substrate film, a releasing agent layer composed of a cured resin from a stearic acid-modified alkyd resin and/or a stearic acid-modified acrylic resin and an amino resin.

The casting film according to the present invention is well suited for use in the production of ceramic green sheets that are employed for ceramic capacitors, laminated inductor elements and the like.

In the following, the present invention will be described in more detail with reference to comparative examples and working examples, which however shall never limit the present invention thereto.

Evaluations were made of the various characteristics of each of the casting films that were obtained through the working examples and comparative examples according to the evaluation procedures as described hereunder.

(1) Wettability of Ceramic Slurry

A blend of 100 parts by weight of barium titanate powder, 10 parts by weight of a water-soluble acrylic resin and 10 parts by weight of polyethylene glycol was prepared, and mixed for 24 hours with a pot stand by the use of zirconia beads having a diameter of 10 mm to produce aqueous ceramic slurry. The resultant ceramic slurry was applied to releasing surfaces of a casting film so that the thickness of the coating after dryness was made to be 6 μm, followed by drying treatment to prepare a green sheet. During the procedure, the wettability (repelling, unevenness of coating being present or not) of the ceramic slurry was visually observed, and the result was evaluated in accordance with the following criterion.

⊚: no repelling nor unevenness of coating observed showing excellent coating surface (not causing practical problem)

○: no repelling observed (not causing practical problem)

X: repelling observed (causing practical problem)

X X: film being non formable (2) Releasability of Green Sheet

<Evaluation by Hand Peeling>

Evaluations were made of the releasability of the green sheets that were prepared in the foregoing procedure (1) by means of hand peeling test.

⊚: releasability being moderate (not causing practical problem)

○: releasability being somewhat interior thereto (not causing practical problem)

X: difficult to release (causing practical problem)

X X: impossible to release (causing practical problem)

<Peeling Force of Green Sheet>

The green sheet which had been prepared in the aforesaid procedure (1) was laminated with a pressure sensitive adhesive tape (manufactured by Nitto Denko Corporation under the trade name "31B Tape") to prepare samples. The resultant samples were allowed to stand under the conditions of 23° C. and 65% R.H. for 24 hours and thereafter were cut into pieces each having a width of 20 mm to prepare test pieces. Subsequently, the casting film was peeled off at angles of 180 degrees at a velocity of 100 m/minute by the use of a tensile testing machine to determine the force required for peeling (peeling force).

EXAMPLE 1

A resin mixture was prepared by mixing a stearic acid-modified alkyd resin (stearyl group content of 50% by weight) a stearic acid-modified acrylic resin (stearyl group content of 33% by weight) and melamine resin which had been subjected to methyl etherification in amounts expressed in terms of solid content of 40%, 40% and 20% each by weight, respectively. The resultant resin mixture was diluted with an organic solvent composed principally of toluene and then, was incorporated with para-toluenesulfonic acid in an amount of 5 parts by weight based on 100 parts by weight of the solid content of the resin mixture to prepare a coating solution having a solid content of 3% by weight.

The coating solution was uniformly applied through gravure coat method, to a biaxially oriented polyethylene terephthalate (PET) film having a thickness of 38 μm so as to form a coating amount expressed in terms of solid content being 0.2 g/m$^2$. Subsequently the coated PET film was heat-treated for 30 seconds in a hot air circulation type dryer at 130° C. to cure the coating solution and prepare a casting film. Various characteristics of the casting film thus obtained are given in Table 1.

EXAMPLE 2

The procedure in Example 1 was repeated to prepare a casting film except that stearic acid-modified alkyd resin, stearic acid-modified acrylic resin and melamine resin which had been subjected to methyl etherification in amounts expressed in terms of solid content of 20%, 60% and 20% each by weight, respectively instead of 40%, 40% and 20%. Various characteristics of the casting film thus obtained are given in Table 1.

EXAMPLE 3

The procedure in Example 2 was repeated to prepare a casting film except that stearic acid-modified alkyd resin (stearyl group content of 50% by weight) and melamine resin which had been subjected to methyl etherification in amounts expressed in terms of solid content of 70% and 30% each by weight, respectively instead of 40% and 20%. Various characteristics of the casting film thus obtained are given in Table 1.

COMPARATIVE EXAMPLE 1

An organic solvent composed principally of toluene was used to dilute a solvent type addition reaction type silicone based releasing agent (solid content of 30% by weight, manufactured by Toray Dow corning Silicone Corporation under the trade name "SRX-211") comprising as a principal ingredient, polydimethyl-siloxane having vinyl group as a functional group and a cross linking agent (polymethylhydrogen siloxane). To the diluted releasing agent were added a platinum base catalyst (solid content of 100% by weight, manufactured by Toray Dow corning Silicone Corporation under the trade name "SRX-212") in an amount of one part by weight based on 100 parts by weight of the silicone based releasing agent to prepare a coating solution having a solid content of 2% by weight.

The coating solution thus prepared was uniformly applied through gravure coat method, to a biaxially oriented PET film having a thickness of 38 μm so as to form a coating amount expressed in terms of solid content being 0.1 g/m². Subsequently the coated PET film was heat-treated for 30 seconds in a hot air circulation type dryer at 130° C. to cure the coating solution and prepare a casting film. Various characteristics of the casting film thus obtained are given in Table 1.

COMPARATIVE EXAMPLE 2

The procedure in Example 1 was repeated to prepare a casting film except that a resin mixture composed of hydroxymethacrylic resin in an amount in terms of solid content of 11% by weight and melamine resin which had been subjected to butyl etherification in an amount in terms of solid content of 89% by weight was diluted with an organic solvent composed principally of toluene, was incorporated with one part by weight of para-toluenesulfonic acid based on 100 parts by weight in terms of solid content of the resin mixture, and heat-treated under the conditions of 170° C. and 30 seconds. Various characteristics of the casting film thus obtained are given in Table 1.

TABLE 1

| | Coatability of ceramic slurry | Releasability of green sheet — Evaluation by hand peeling | Releasability of green sheet — Peeling force (mN / 25 mm) |
|---|---|---|---|
| Example 1 | ○ | ⊚ | 5.98 |
| Example 2 | ⊚ | ⊚ | 4.12 |
| Example 3 | ○ | ○ | 7.50 |
| Comparative Example 1 | X X | — | — |
| Comparative Example 2 | ⊚ | X X | — |

What is claimed is:

1. A casting film which is used for producing a ceramic green sheet and which comprises a substrate film and a releasing layer formed on at least either side thereof, wherein said releasing layer comprises a cured resin from (A) a stearic acid-modified alkyd resin and/or a stearic acid-modified acrylic resin and a (B) amino resin.

2. The casting film for producing a ceramic green sheet according to claim 1, wherein the stearic acid-modified alkyd resin has a stearyl group content of 40 to 60% by weight, and/or the stearic acid-modified acrylic resin has a stearyl group content of 20 to 40% by weight.

3. The casting film for producing a ceramic green sheet according to claim 1, wherein the (B) amino resin is at least one member selected from the group consisting of melamine resin, urea resin and urea-melamine resin, each being etherified by a lower alcohol.

4. The casting film for producing a ceramic green sheet according to any one of claims 1, 2 and 3, wherein the content of the component (B) is 5 to 40% by weight based on the total sum of the solid content of the components (A) and (B).

5. The casting film for producing a ceramic green sheet according to claim 1, wherein the substrate film comprises polyethylene terephthalate.

6. The casting film for producing a ceramic green sheet according to claim 1, wherein the component (A) is composed of the mixture of the stearic acid-modified alkyd resin and the stearic acid-modified acrylic resin.

7. The casting film for producing a ceramic green sheet according to claim 1, wherein the cured resin is formed in the presence of an acid catalyst.

* * * * *